UNITED STATES PATENT OFFICE.

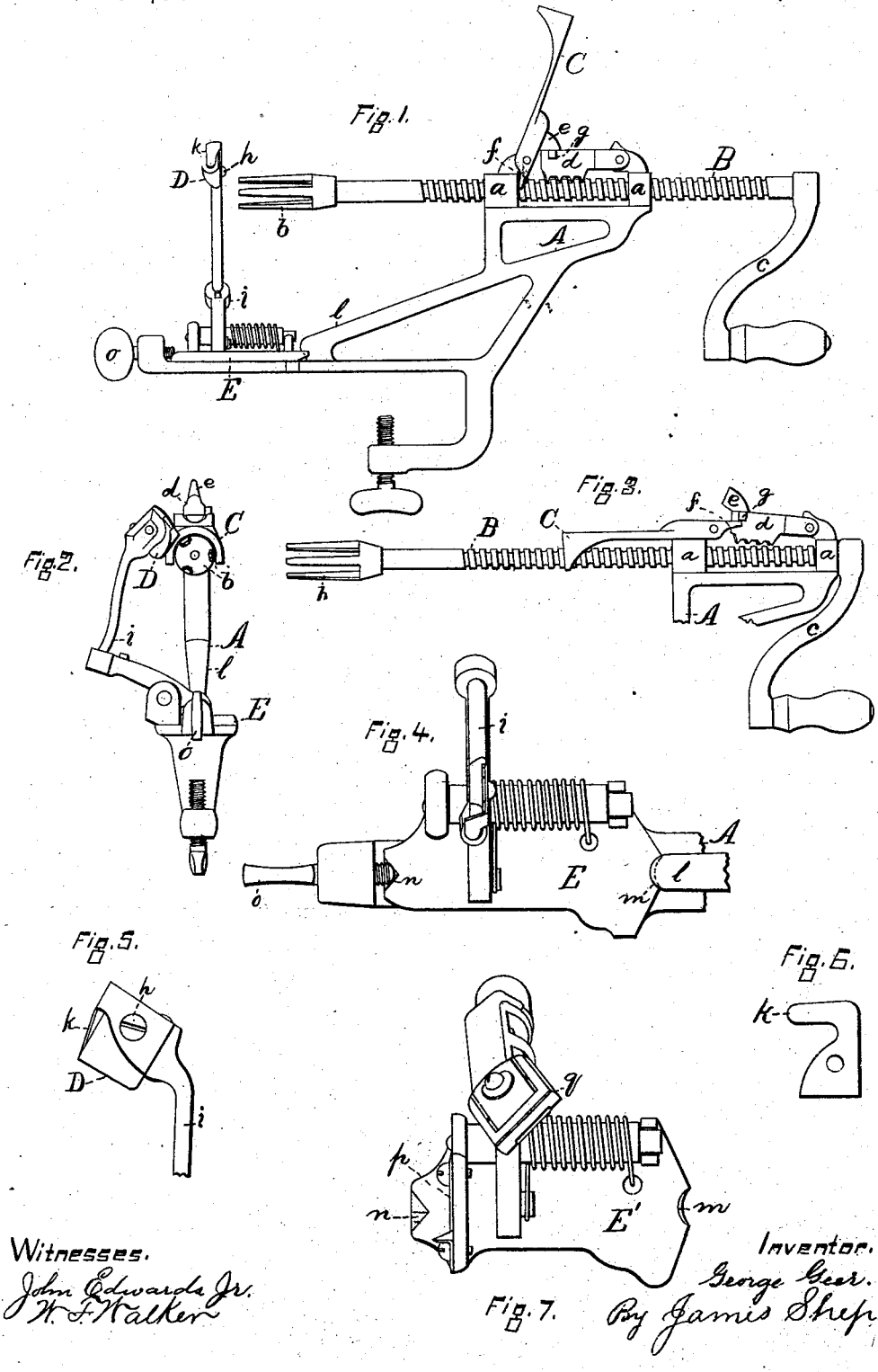

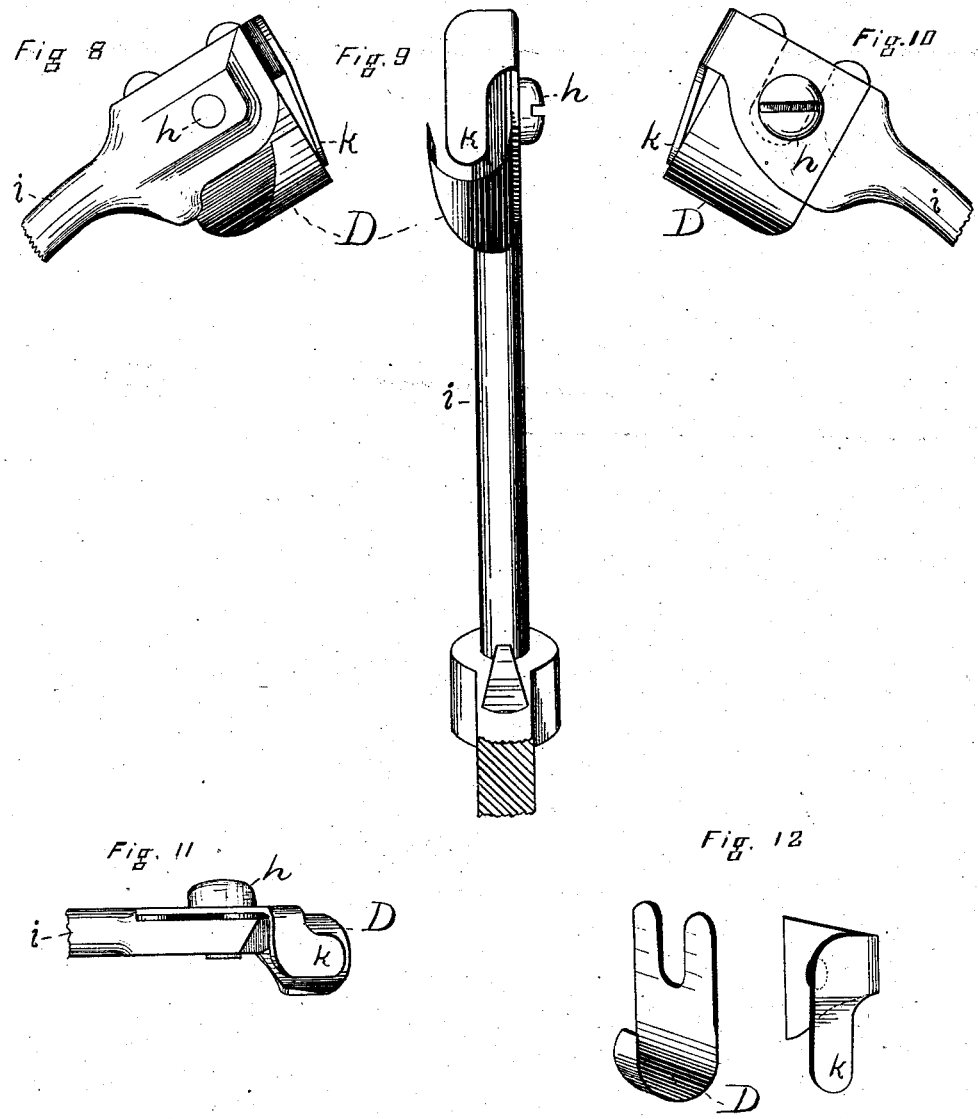

GEORGE GEER, OF PETERBOROUGH, NEW HAMPSHIRE.

POTATO-PARER.

SPECIFICATION forming part of Letters Patent No. 292,554, dated January 29, 1884.

Application filed June 24, 1882. (Model.)

*To all whom it may concern:*

Be it known that I, GEORGE GEER, of Peterborough, in the county of Hillsborough and State of New Hampshire, have invented certain new and useful Improvements in Potato-Parers, of which the following is a specification.

My invention relates to improvements in vegetable and fruit parers.

In my improved parer the screw-shaft is combined with a hinged rack and knock-off. The guard for the paring-knife is of a peculiar construction, and the frame is provided with means for the attachment and detachment of different paring-knife holders; and the objects of my improvements are convenience of operation, cheapness of construction, durability of the parts, and interchangeability of the knives for paring different kinds of vegetables or fruits. I attain these objects by the mechanism illustrated in the accompanying drawings, in which—

Figure 1 is a front elevation of my potato-parer. Fig. 2 is a side elevation or end view of the same. Fig. 3 is a front elevation of detached parts of the same. Fig. 4 is a plan view of other detached parts. Fig. 5 is a side elevation of the paring knife and guard. Fig. 6 is a plan view of the blank from which the guard is formed. Fig. 7 is a plan view of an attachable and detachable knife-holding frame and knives particularly designed for paring and slicing fruit. Fig. 8 is an enlarged side elevation of the knife-arm, the paring-knife, and the guard. Fig. 9 is an enlarged front elevation of the same. Fig. 10 is an enlarged side elevation of the opposite side of the same from that shown in Fig. 8. Fig. 11 is an enlarged plan view of the same, and Fig. 12 is an enlarged perspective view of the knife and the guard, detached from each other and from the knife-arm.

A designates the main frame of the machine, provided with bearings *a a*, in which the screw-shaft B may revolve and through which it may slide longitudinally, said shaft, as in ordinary fruit and vegetable parers, being provided with the fork *b* and crank *c*.

To one of the bearings *a a*, I hinge a toothed block or rack, *d*, the teeth of which, when the rack is allowed to fall, engage the thread of the screw-shaft B, as shown in Fig. 1.

Upon the end of the rack *d* is a stop, *e*, to engage the hinged knock-off C, and when it is turned back to hold it in the position shown in Fig. 1. This knock-off C is hinged to the other end of the bearings *a a*, and its long or outer end is so formed as to partially surround the screw-shaft, as shown in Fig. 2, while its short end *f*, upon one side, projects far enough to engage the lug *g* on the side of the rack *d*, and thereby raise the teeth of the rack *d* out of the thread of the screw-shaft when the knock-off is thrown down, as shown in Figs. 2 and 3.

In use I intend to so arrange the knock-off and the crank that the latter will strike the former just as the paring-knife finishes its work, and throw the knock-off from the position represented in Fig. 1 into that represented in Figs. 2 and 3, to release the rack from the thread. The screw-shaft B is then drawn backward, and as the fork is drawn under the knock-off it is cleared of the potato or whatever else has just been on the fork for paring. The knock-off is then swung back by hand into the position shown in Fig. 1, where it stays by the force of gravity. The parts are also so related to each other that when the fork is thus drawn back part of the unthreaded portion of the screw-shaft B comes in under the teeth of the rack, so that the latter cannot then fall into the screw-thread when the knock-off is raised. Inasmuch as the teeth of the rack do not enter the thread, the shaft may, when the fork has been reloaded, be slid forward quickly to the proper point for the knife to begin paring, the rack merely vibrating as the screw-thread passes thus quickly under it; but so soon as the shaft is revolved the teeth of the rack engage the screw-thread, so that the shaft cannot be slid either way without lifting the rack. If the screw-shaft is slid slowly under the rack, the rack will engage and stop the longitudinal movement of the shaft, except such as is imparted thereto by revolving the shaft.

D designates the potato-paring knife, which consists of a piece of sheet-metal bent into U shape, sharpened on one edge, and secured by a screw, *h*, to the side of the rocker arm *i*. The guard *k* is also made of sheet metal by bending a blank, like that in Fig. 6, across its narrow neck into the position shown in Fig.

5, so that its body may be secured to the flat side of the arm $i$ by the same screw $h$ which secures the parer-knife, while the guard proper lies within the U-shaped knife. This guard is hardened quite hard on its lower rounded end, so as to make it durable, while above the end it is left soft enough so that it may be bent to properly adjust it with relation to the edge of the knife D—that is, so as to make the lower rounded end of the guard to stand over or a little in front of the cutting-edge of said knife.

By making the guard with provision for securing it to one side of the rocker arm $i$, instead of to the arm thereof, the fastening-screw never projects so as to be in the way, and the knife can readily enter and pare neatly the skin from the deepest depressions in potatoes, no matter how irregular their shape may be, as the knife retains its hold and cuts all over the surface of potatoes of the most irregular form, whereas when the guard is screwed to the end of the arm, as formerly, the head of the screw oftentimes comes in contact with the potato, when of an irregular shape, and prevents the knife from paring the bottoms of depressions or deep curves.

The rocker-arm $i$ is made yielding by means of a spring surrounding the rocker-shaft, as in other parers. This arm rocker shaft and spring are mounted upon a base-plate, E, which parts, when taken together, I term the "supplemental frame," having the paring-knife and its appurtenances mounted thereon.

The base-plate E and the like base-plate E', Fig. 7, have notches $m\ n$ at their ends, of which $m$ takes under the overhanging end of the brace $l$ of the frame A, and the notch $n$ receives the end of the set-screw $o$ at the end of the frame A. By loosening the set-screw $o$, one plate, E, bearing the potato-paring knife, may be removed, and another like plate, as E', bearing a slicing-knife, $p$, and paring-knife $q$, specially designed for paring and slicing fruit, may be attached in its place, for use with the same main frame, screw-shaft, &c.

The knives on the plate E' may be of any ordinary construction, and so far as this part of my invention is concerned the potato-parer may be of any ordinary construction. In fact it is immaterial what particular kind of fruit or vegetables the knives are adapted for paring, the essential point being a paring-machine the frame of which is adapted for use with interchangeable supplementary frames having the paring-knife and its appurtenances mounted thereon.

I am aware that a prior patent shows a parer in which the slicing-knife is made attachable and detachable by means of a slotted screw which requires the use of a screw-driver in changing the slicing-knives, but the paring-knife in said machine was not detachable. Such a construction is hereby disclaimed. Different kinds of objects to be pared—as potatoes and apples—require different kinds of paring-knives, and it is also important that when a slicing-knife is used in connection therewith, it shall be very nicely adjusted with reference to the paring-knife. In my machine the paring-knives, together with their springs and the base-plate upon which they are mounted are all attached and detached together at one time, so as to sustain their proper relations to each other, and when a slicing-knife is employed it is also permanently secured to said base-plate, so that it may be properly set and adjusted by a skilled mechanic at the factory where made, and so that said adjustment will not be disturbed or altered in detaching and attaching different knife-holders.

I am also aware that the drawing in the Patent No. 16,843, to B. F. Joslyn, March 17, 1857, appears to show an apple-parer having two uprights and a paring-knife-holder frame separately constructed and fastened to a common bed, whether or not this knife-holding frame is so constructed as to be detachable from the bed cannot be definitely ascertained from an inspection of said drawing, and the patent makes no reference in any way to a knife-holding frame, which is attachable to and detachable from the bed to which the uprights and knife-holding frame are secured, or that in any way refers to interchangeable knife-holding frames.

So far as I know, a paring-machine having a main frame and an attachable and detachable supplemental frame bearing the paring-knife and its appurtenances has never been patented nor described in any printed publication.

I claim as my invention—

1. The combination of the screw-shaft, fitted to slide longitudinally, with the hinged rack and the hinged knock-off, all operating together, substantially as described, and for the purpose specified.

2. The combination of the shaft, fitted to slide longitudinally and bearing the fork $b$, with the hinged knock-off hung over one of the bearings of the shaft, and adapted to swing over the shaft from the position represented in Fig. 1 to that represented in Figs. 2 and 3, substantially as described, and for the purpose specified.

3. The combination of the hinged rack, the hinged knock-off, the screw-shafts, and the crank adapted to drive the screw-shaft, and also to throw over said hinged knock-off, substantially as described, and for the purpose specified.

4. In a potato-parer, the combination of the knife-arm, the U-shaped paring-knife, and the guard having the rounded lower end of a contour corresponding to the cutting-edge of the said knife but smaller, said guard being formed of sheet metal, and having that portion which is above its rounded and hardened end free to be bent while secured to said knife-arm, in order to properly adjust the hardened point of said guard with reference to the paring-knife, substantially as described.

5. In a paring-machine, the sheet-metal guard formed with a broad body by which to secure it to one side of the knife-arm, the rounded end which forms the guard proper, $k$, and a narrow neck with the angular bend therein between said body and guard proper, substantially as described, and for the purpose specified.

6. In a paring-machine, the combination of the main frame, a supplemental frame having the paring-knife and its appurtenances mounted thereon, and mechanism for securing and releasing said supplemental frame and its appurtenances to and from the main frame, substantially as described, and for the purpose specified.

GEORGE GEER.

Witnesses:
 EZRA M. SMITH,
 S. M. SMITH.